(12) United States Patent
Patil et al.

(10) Patent No.: US 9,323,071 B2
(45) Date of Patent: Apr. 26, 2016

(54) LASER SPECKLE REDUCTION FOR UNIFORM ILLUMINATION

(71) Applicant: Texas Instruments Incorporated, Dallas, TX (US)

(72) Inventors: Bharath Patil, Karnataka (IN); Karthik Rajagopal, Bangalore (IN); Subhash Chandra Venkata Sadhu, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/486,057

(22) Filed: Sep. 15, 2014

(65) Prior Publication Data

US 2015/0078001 A1 Mar. 19, 2015

(30) Foreign Application Priority Data

Sep. 17, 2013 (IN) ............................ 4152/CHE/2013

(51) Int. Cl.
*F21V 11/00* (2015.01)
*G02B 27/20* (2006.01)
*G02B 27/48* (2006.01)

(52) U.S. Cl.
CPC ...................................... *G02B 27/48* (2013.01)

(58) Field of Classification Search
CPC ..... G02B 27/48; F21V 3/0427; F21V 3/0445; F21V 5/002
See application file for complete search history.

(56) References Cited

U.S. PATENT DOCUMENTS

| 3,587,424 | A * | 6/1971 | Paine et al. ................... 396/155 |
| 5,280,169 | A * | 1/1994 | Honey et al. .................. 250/216 |
| 6,191,887 | B1 | 2/2001 | Michaloski et al. |
| 2007/0140616 | A1* | 6/2007 | Sugita et al. ................... 385/32 |
| 2011/0199686 | A1* | 8/2011 | Fujisawa ....................... 359/599 |

OTHER PUBLICATIONS

Sitnikova, Natalia L. et al, "Spontaneously Formed trans-Anethol/Water/Alcohol Emulsions: Mechanism of Formation and Stability", Langmuir, May 27, 2005, pp. 7083-7089, vol. 21, American Chemical Society.
"Colloid", Wikipedia article [online], [retrieved on Sep. 15, 2014], [retrieved from the internet at world wide web uniform resource locator address: http://en.wikipedia.org/wiki/Colloid].

* cited by examiner

*Primary Examiner* — Donald Raleigh
(74) *Attorney, Agent, or Firm* — Gregory J. Albin; Frank D. Cimino

(57) ABSTRACT

Laser speckle reduction using a passive diffuser. A diffuser for reducing laser speckle is disclosed comprising a diffuser having a colloid configured for placement in a light path of a coherent light source. The colloid exhibits Brownian motion. The diffuser can be formed of transparent plates containing the colloid. In a system for illumination, a coherent source of light outputting a light beam along a light path is provided; and a diffuser for reducing laser speckle effects is placed in the light path, the diffuser comprising a colloid disposed in a container that is transparent to the light beam output by the coherent source. A method includes illuminating a photosensitive sensor, comprising transmitting a coherent light from a light source through a diffuser comprising a colloid and directing the light from the diffuser onto the photosensitive sensor. Additional embodiments are disclosed.

19 Claims, 5 Drawing Sheets

LASER SPECKLE REDUCTION FOR UNIFORM ILLUMINATION

RELATED APPLICATIONS

This patent application claims priority to India Provisional Patent Application No. 4152/CHE/2013, filed Sep. 17, 2013, entitled "Laser Speckle Reduction for Uniform Illumination," which is hereby incorporated by reference herein in its entirety.

TECHNICAL FIELD

The embodiments relate generally to the use of coherent light sources where uniform illumination is needed. The use of coherent light sources, such as (but not limited to) lasers, for illumination is increasing. Coherent sources of light output electromagnetic radiation waves that are of the same wavelength, same frequency and are in phase or have a constant phase difference. Lasers are a commonly used source of coherent light, however before lasers were produced and available, incoherent light sources were used with pinhole or slit arrangements to produce coherent light. In this application, the word "light" is not limited to light that is visible to the human eye but includes infrared, ultraviolet and other frequencies of electromagnetic energy as well. Coherent light sources, such as lasers, used in known prior solutions exhibit speckle patterns. Speckle patterns result when coherent light is directed onto a rough surface or when it is observed through an optically rough medium. The speckle is due to interference that is caused by use of a coherent beam of light. These speckle patterns make the use of coherent light sources for uniform illumination impractical or even impossible for certain applications. The embodiments provide a novel and robust passive method for reducing or eliminating the speckle pattern when using a coherent light source, such as a laser, for illumination.

BACKGROUND

Lasers provide an effective source of coherent energy for illumination. Lasers can provide visible light, such as seen in the use of laser pointers and laser light shows, or infrared or other frequency energy not visible to the human eye. Lasers provide monochromatic light which is particularly useful in certain settings. Because the laser provides a cost effective and source of coherent light, it is particularly well suited to certain applications. Examples include as a light source for projectors such as DLP projectors, as a pulsed light source for time of flight (TOF) measurements in 3D imaging sensors, and for laser based illumination systems. The laser provides a monochromatic light that is also spatially coherent, which makes it particularly useful for laser pointers, for example.

In some applications highly uniform illumination is needed. For example, uniform illumination is required in testing TOF image sensors. While lasers provide a cost effective source of coherent light, the use of lasers for uniform illumination has been thought to be impractical or impossible due to the laser speckle effect.

FIG. 1 illustrates an example of laser speckle that is observed using a prior known laser system. The image 10 in FIG. 1 was obtained by directing a camera at a wall that was illuminated by a laser beam after reflection from a plastic surface (a mobile phone). (Note that the image 10 in FIG. 1 is a drawing in black and white used for the purpose of this patent application, the shading is used to represent the color red that is visible in the original color image.) The speckle pattern is clearly seen. The image illustrated in FIG. 1 is shown in color and described in an article in Wikipedia that is located at the internet world wide web uniform resource locator address http://en.wikipedia.org/wiki/Speckle_pattern.

FIG. 2 illustrates a second example of laser speckle in an image 20. (Note that FIG. 2 is also a black and white illustration of a color image, black and white is used for the purposes of filing this patent application. The shading in FIG. 2 represents the original color image, which was red to purple). In FIG. 2, a laser was directed at a CCD image sensor without a lens. The laser beam from a red laser pointer was directed through a known prior diffuser, a holographic diffuser, and then onto the CCD image sensor. The pattern observed by the CCD image sensor is clearly non-uniform. For an image sensor test application, a uniform illumination is required so that weak or bad pixels can be identified by comparison of charge that is stored in the pixel charge storage element to some expected value. However if the light source used exhibits non-uniform areas, as in this prior known solution shown in FIG. 2, then it is not useful in applications such as testing for image sensors.

Another application of interest is in characterizing image sensors such as are used for time of flight ("TOF") measurements used, for example, in 3D imaging systems. TOF measurements are used to determine phase differences in a light (which may be visible, infrared or other spectrum) that is directed towards an object and reflected light is then captured at a depth sensor. The phase difference of the reflected light varies with the distance of the object from the sensor and the illumination source, so by measuring the time of flight for different areas, a distance correlation can be determined, providing depth information (depth being greater for objects that are farther from the image sensor or camera). A pulsed light source is often used for TOF measurements. The manufacture of the TOF image sensors requires a uniform illumination source to test the sensors. Laser devices are easily used in such a pulsed light application; however, the illumination must be uniform to be effective for TOF applications.

Prior known solutions for reducing laser speckle require mechanically moving diffusers, such as rotating or vibrating devices, or require electrically active diffusers, placed in the laser beam path. Some prior known solutions use specialized materials that can change the polarization, phase, or direction of the incoming laser light at a fixed frequency. These techniques use active devices that require electronic circuitry to provide a required signal. These solutions require power and can add undesirable mechanical or electrical noise sources to the system. An example prior solution is described in U.S. Pat. No. 6,191,887 B1, entitled "Laser Illumination with Speckle Reduction," issued to Micahloski et al. on Feb. 20, 2001. Micahloski involves directing laser pulses into a plurality of beam splitters and delay lines to create a plurality of different speckle patterns that are then combined together at a sensor. When the speckle patterns are combined with differing delay paths, the average of the speckle patterns taken together results in a more or less uniform pattern at a sensor. This solution is complex and requires beam splitters, "pulselet" delay lines and temporal separation and spatial aberration of the "pulselets" to achieve the more uniform illumination.

Improvements in laser speckle reduction are therefore needed to address the deficiencies and the disadvantages of the known prior approaches. Solutions are needed that provide uniform illumination from a coherent light source without laser speckle or with substantially reduced laser speckle effects. Solutions are needed that are low in cost, that are robust, and that are easy to implement and use.

SUMMARY

Aspects of the present application provide a novel passive laser speckle reduction that overcomes the deficiencies and the disadvantages of the known prior solutions. A diffuser device is provided that is formed using a colloid. The colloid exhibits Brownian motion. The material inherently exhibits Brownian motion without mechanical or electrical stimulation and the diffuser is entirely passive. The colloid material is stable and is readily available. A laser beam passed through the novel diffuser device exhibits excellent illumination uniformity when observed at an image sensor.

In an aspect of the present application, the colloid is contained in any container that is transparent to the light from a coherent light source. In another aspect of the present application, a diffuser for reducing laser speckle comprises a colloid disposed between plates that are transparent to a selected light frequency configured for placement in a light path of a coherent light source. In a further arrangement, the colloid exhibits Brownian motion. In another alternative arrangement, the colloid further comprises a solid dispersed phase material disposed in a liquid dispersant. In additional aspects of the present application, the colloid further comprises a liquid dispersed phase material disposed in a liquid dispersant, a solid dispersed phase material disposed in a gaseous dispersant, or a liquid dispersed phase material disposed in a gaseous dispersant. In still another arrangement, the colloid further comprises one selected from the group of inks, sol paints, milks, emulsified paint, trans-Anethol/ethanol/water and combinations thereof.

In additional aspects of this application, in the diffuser described above, the colloid is disposed between plates that are transparent and further comprise one selected from the group of glass, Perspex, acrylic, polycarbonates, transparent ceramics and combinations thereof. In still further aspects of the present application, the plates that are transparent further comprise glass. In yet another arrangement of the diffuser described above, a thickness of the colloid in the diffuser is in the range of 1 nanometer to 5 microns. In a further alternative aspect, in the diffuser described above, the colloid further comprises a solid dispersed phase material having a particle size between 1 nanometer and 1 micrometer.

In another aspect of this application, a system for illumination is provided, comprising a coherent source of light outputting a light beam along a light path; and a diffuser for reducing laser speckle effects placed in the light path, the diffuser comprising a colloid disposed in the path of the light beam output by the coherent source. In still another aspect of this application, in the system described above the diffuser further comprises the colloid comprising a solid dispersed phase material disposed in a liquid dispersant medium. In yet another arrangement, in the system described above, the diffuser further comprises a liquid dispersed phase material disposed in a liquid dispersant medium. In an additional aspect of this application, in the system described above, the coherent light source further comprises a laser. In still another alternative arrangement, in the system described above the laser is one selected from a semiconductor laser, a solid state laser, a p-i-n diode laser, an edge emitting laser diode, and a vertical cavity surface emitting laser. In a further aspect of this application, in the system described above, the diffuser further comprises a pair of transparent plates that are of a material that is one selected from glass, acrylic, polycarbonate, Perspex ceramic glass, transparent ceramics and combinations thereof.

In yet another aspect of the present application, a method is provided for illuminating a photosensitive sensor, comprising transmitting a coherent light from a light source through a diffuser comprising a colloid disposed in the path of the coherent light which then falls onto the photosensitive sensor. In a further arrangement, in the method above the diffuser further comprises a colloid that exhibits Brownian motion. In still another aspect of the present application, in the method above, the colloid further comprises a material that is one selected from a solid dispersed phase material disposed in a liquid dispersant, a liquid dispersed phase material disposed within a liquid dispersant, a solid dispersed phase material disposed in a gaseous dispersant, and a liquid dispersed phase material disposed within a gaseous dispersant.

Previously, use of coherent light or laser illumination was thought to be impractical or impossible in applications requiring uniform illumination, due to the inherent laser speckle effect. Aspects of this application provide a robust passive diffuser to attain uniform illumination using coherent light sources.

BRIEF DESCRIPTION OF THE DRAWINGS

For a more complete understanding of the illustrative embodiments described herein and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

The making and using of example illustrative embodiments are discussed in detail below. It should be appreciated, however, that the embodiments provide many applicable inventive concepts that can be embodied in a wide variety of specific contexts. The specific embodiments discussed are merely illustrative of specific ways to make and use the various embodiments, and the examples described do not limit the scope of the specification, or the scope of the appended claims.

For example, when the term "coupled" is used herein to describe the relationships between elements, the term as used in the specification and the appended claims is to be interpreted broadly, and is not to be limited to "connected" or "directly connected" but instead the term "coupled" may include connections made with intervening elements, and additional elements and various connections may be used between any elements that are "coupled."

In the embodiments, novel solutions are provided to achieve laser speckle reduction using a passive diffuser. It is discovered that a colloid exhibiting Brownian motion can be used as a passive diffuser in a laser illumination system, and that the random motion that inherently exists in the colloid provides a uniform illumination without the need for any additional power or mechanical movement. Further, the novel passive diffuser can be used with any coherent light source to reduce the speckle effect.

Figure 3:
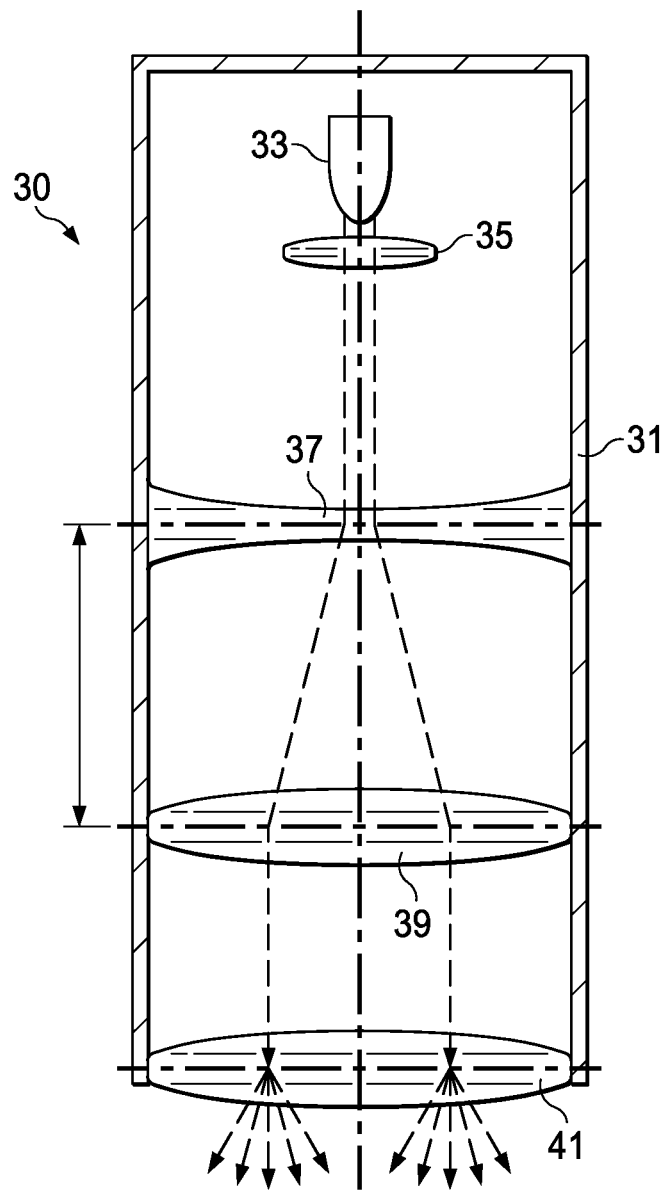
FIG. 3 illustrates an example embodiment system for laser illumination incorporating the embodiments.

FIG. 3 depicts in a cross sectional view an example system 30 for illustrating an embodiment. In the system 30 a laser is used as a coherent light source, however, the embodiments and the claims appended hereto are not so limited. In additional embodiments, an alternative coherent light source can be used. In the system 30, a housing 31 is provided with a laser 33 mounted in the housing. A collimator 35 is placed near the laser to shape the beam, and a diverging element 37 and a converging element 39 further shape the laser beam. The laser is typically a pulsed laser although a continuous wave laser could be used. A novel diffuser for reducing the laser speckles 41 is provided in the laser beam path. By using the novel diffuser of the embodiments, the system advantageously provides a uniform illumination at the output.

In the embodiments, diffusers for laser speckle reduction comprise a colloid. The colloid may be, for example, disposed within two transparent plates. However the colloid may be contained in any vessel or body that is transparent to the coherent light. In an alternative embodiment, a beaker containing the colloid can be used. Other alternatives include various transparent container shapes containing the colloid such as columns, cubes, balls, spheres, lenses and the like. A colloid is a dispersed phase material disposed in a dispersal medium. In a colloid, the particle sizes of the dispersed phase material are such that the colloid is neither a solution, nor is it a suspension. The dispersed phase material does not dissolve in the dispersion medium to form a solution. Further the particles do not settle out of the dispersion medium, as occurs in a suspension. A common example of a natural colloid is cow's milk. A man-made colloid includes trans-anethol/ethanol/water emulsion, also known as ouzo, pastis, and other anise flavored liqueurs. These anethol/ethanol colloid materials are described in detail in a paper entitled "Spontaneously Formed trans-Anethol/Water/Alcohol Emulsions: Mechanism of Formation and Stability," Sitnikova et al., Langmuir 2005, vol. 21, pp. 7083-7089, American Chemical Society, 2005, which is hereby incorporated herein by reference in its entirety. Another man-made colloid is emulsified paint.

Colloids are stable uniform mixtures that do not settle out over time. Of particular application to the embodiments are colloids that exhibit Brownian motion. Liquid dispersal medium with solid dispersed phase material, such as milk, sol paint, inks, and the like form colloids that can be incorporated in the embodiments. Liquid dispersed phase material that is in liquid dispersion material such as emulsified paint, ouzo, and the like can be used to form additional embodiments. Liquid or solid dispersed phase material that is in a gaseous dispersion material such as aerosols, fog, and the like can be used to form embodiments that are contemplated as additional alternative embodiments herein, and which are encompassed by the scope of the appended claims.

Colloids used in the embodiments advantageously exhibit Brownian motion. The Brownian motion occurs inherently due to the particle sizes and the gravitational field on the particles in the dispersed phase material. The Brownian motion is random, and no mechanical or electrical stimulus is needed. The Brownian motion is at a high frequency and random in nature. When the coherent light is passed through a diffuser with the colloids of the embodiments, the laser speckle is greatly reduced or entirely eliminated. Surprisingly, the use of the embodiments advantageously provides a passive diffuser for coherent light that is effective in eliminating or greatly reducing laser speckle, without the need for power, and without the need for mechanical vibration or rotation.

The particles in the colloid can range in size from 1 nanometer to 1 micron in size. The colloid diffuser of the embodiments is very effective at scattering visible and near infrared light. The Brownian motion ensures that the scattering pattern varies randomly over time. The diffuser with the colloid has a frequency of scattering pattern change that is very large.

The colloid is disposed in a transparent container. For example, in an embodiment that illustrates the advantageous features, the colloid is disposed between transparent plates that form a diffuser device. The transparent material can vary and the plates need only be of material that is transparent to the frequency of the light or energy being transmitted. Examples of the transparent material include glass, acrylic, polycarbonate, Perspex, and glass-ceramic. Transparent ceramic materials such as transparent alumina and transparent spinel ($MgAl_2O_4$) can be used to form additional alternative embodiments. The colloid is contained within the transparent plates and the diffuser can be mounted in the housing as shown in FIG. 3 above. Alternatively the diffuser could be provided elsewhere in the light beam path.

In an example embodiment, a layer of milk that was 1.6 nanometers thick was used as the colloid. As the colloid density is increased, the thickness of the colloid layer can be reduced. Optimum thicknesses may be obtained through routine experimentation with a particular colloid. The diffuser thickness may increase to several microns, as the selected colloid particle size increases.

Figure 4:
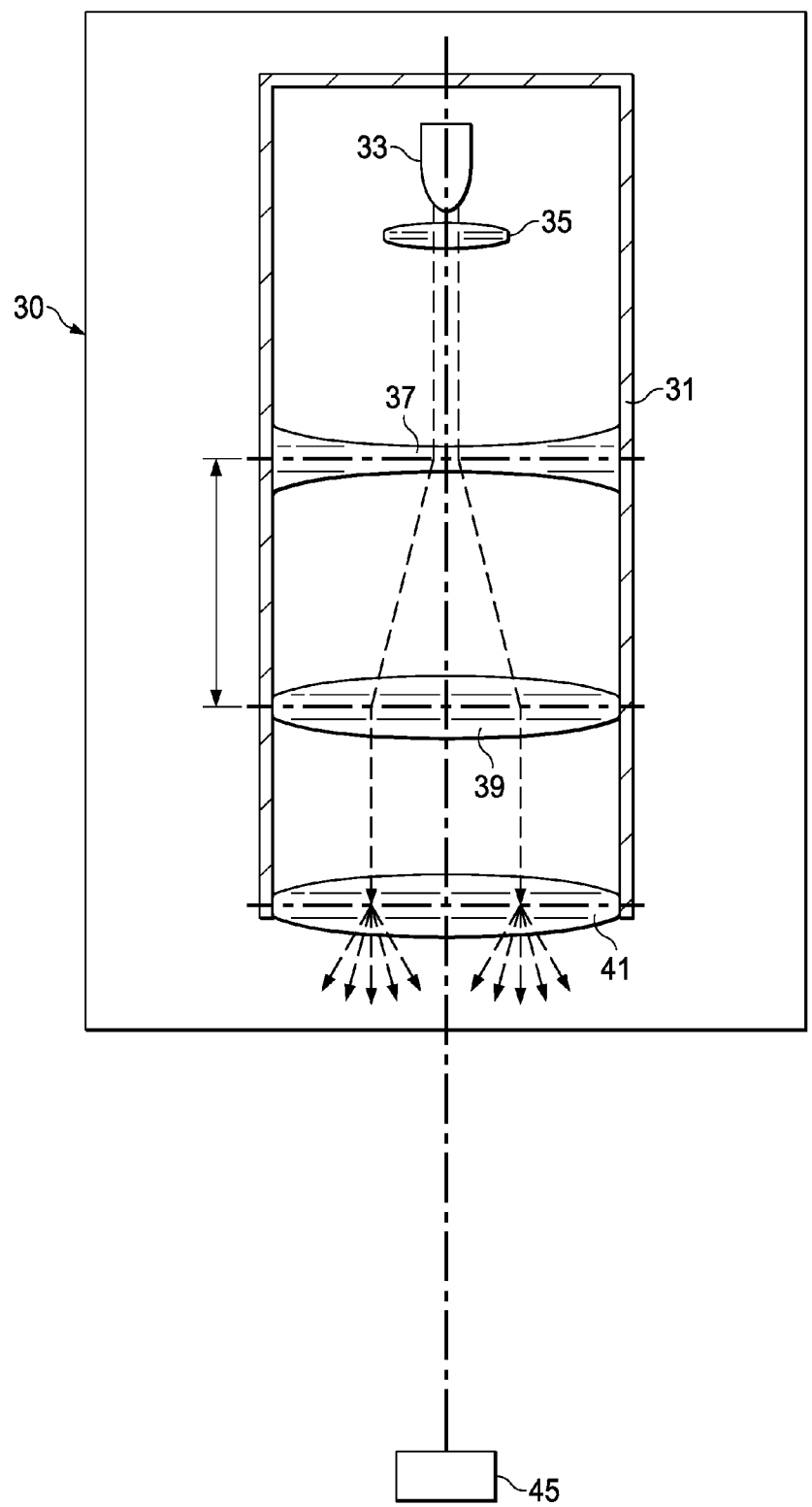
FIG. 4 illustrates the example embodiment system for laser illumination of FIG. 3 configured to illuminate a photosensitive sensor.

FIG. 4 depicts in an example application the laser illumination system 30 in a sensor test environment. The elements of FIG. 3 are repeated in FIG. 4. An image sensor 45 is shown receiving laser illumination from the system 30. Because the novel colloid diffuser is used, a uniform illumination is achieved without laser speckle.

Figure 1:
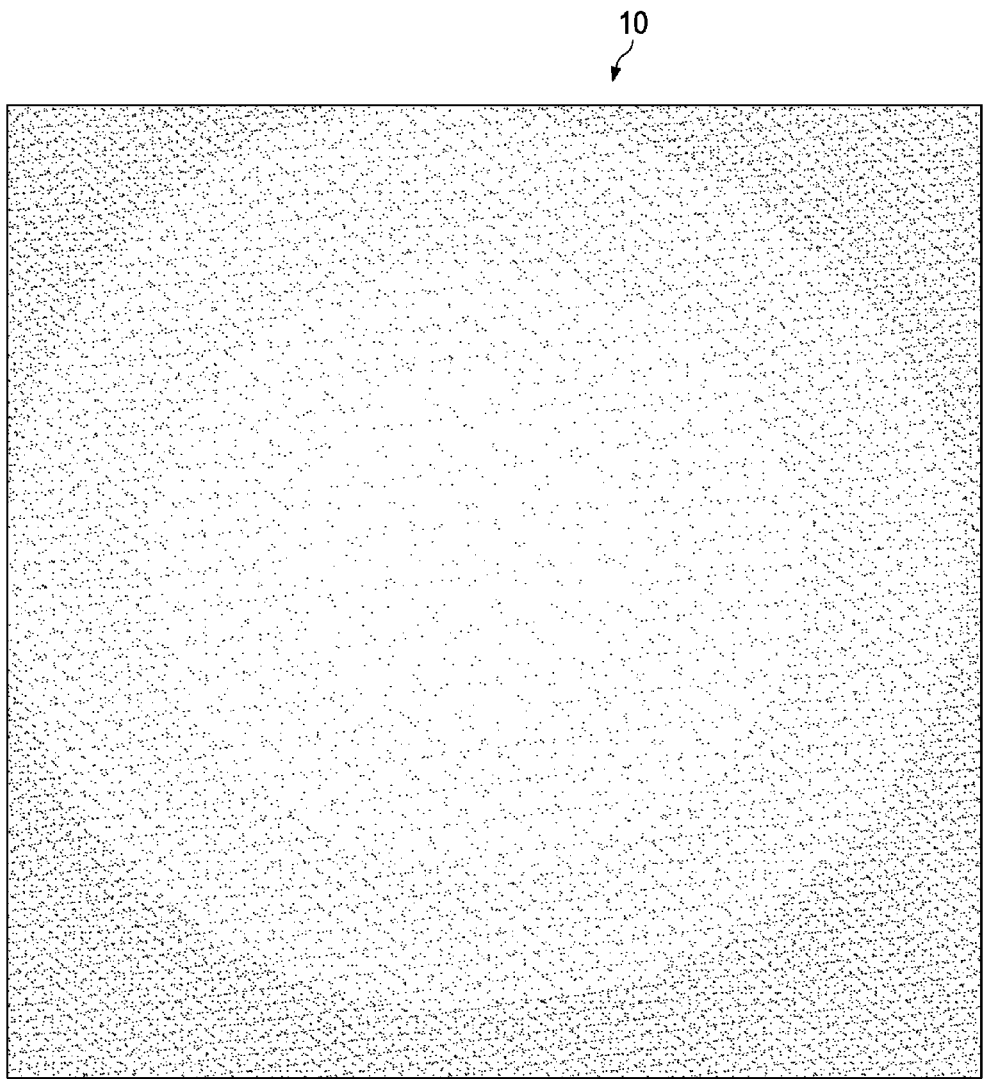
FIG. 1 illustrates in an image the laser speckle phenomenon.
Figure 2:
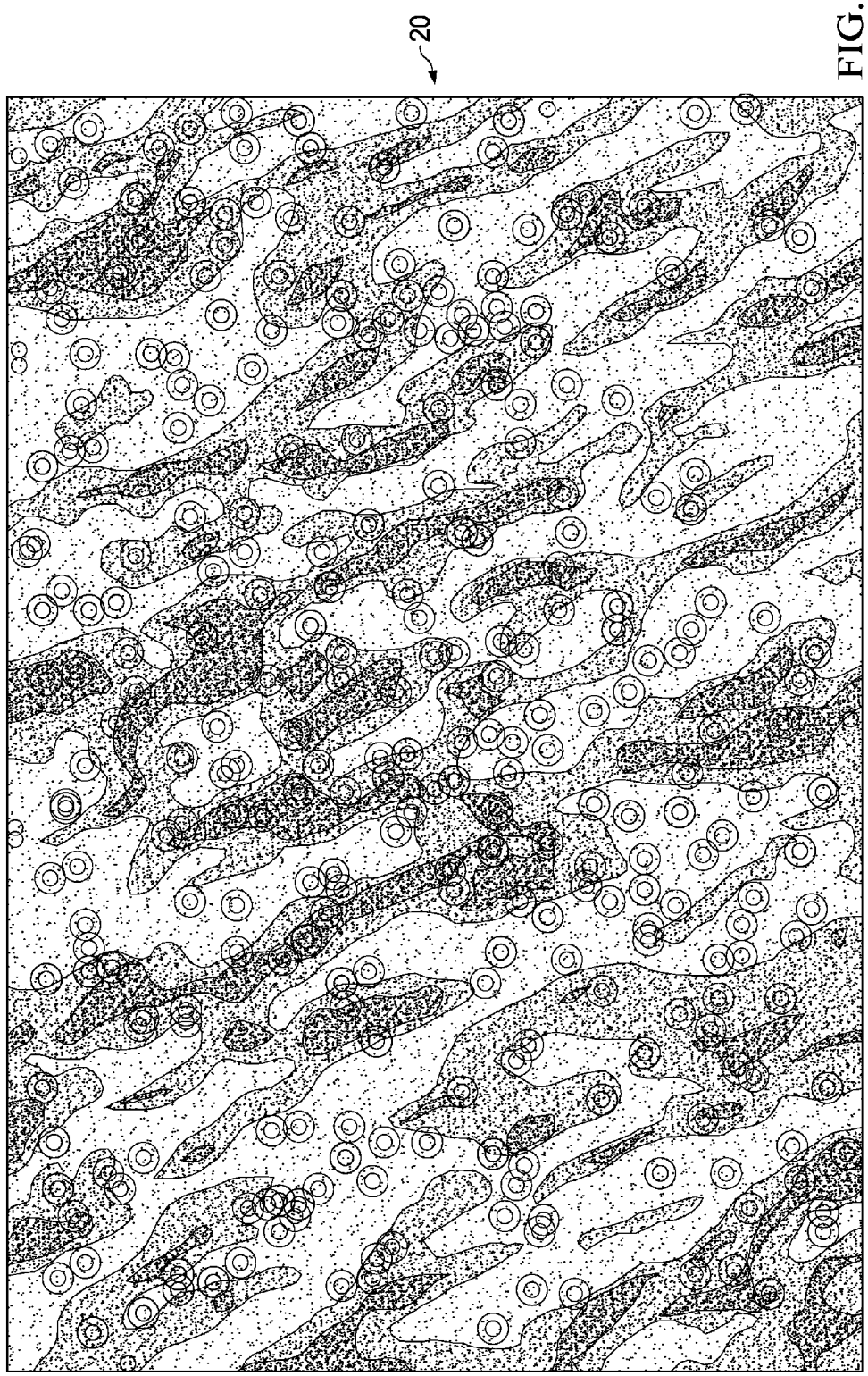
FIG. 2 illustrates in an image the laser speckle that exists after a diffuser of the prior known solutions is utilized with a laser pointer.
Figure 5:
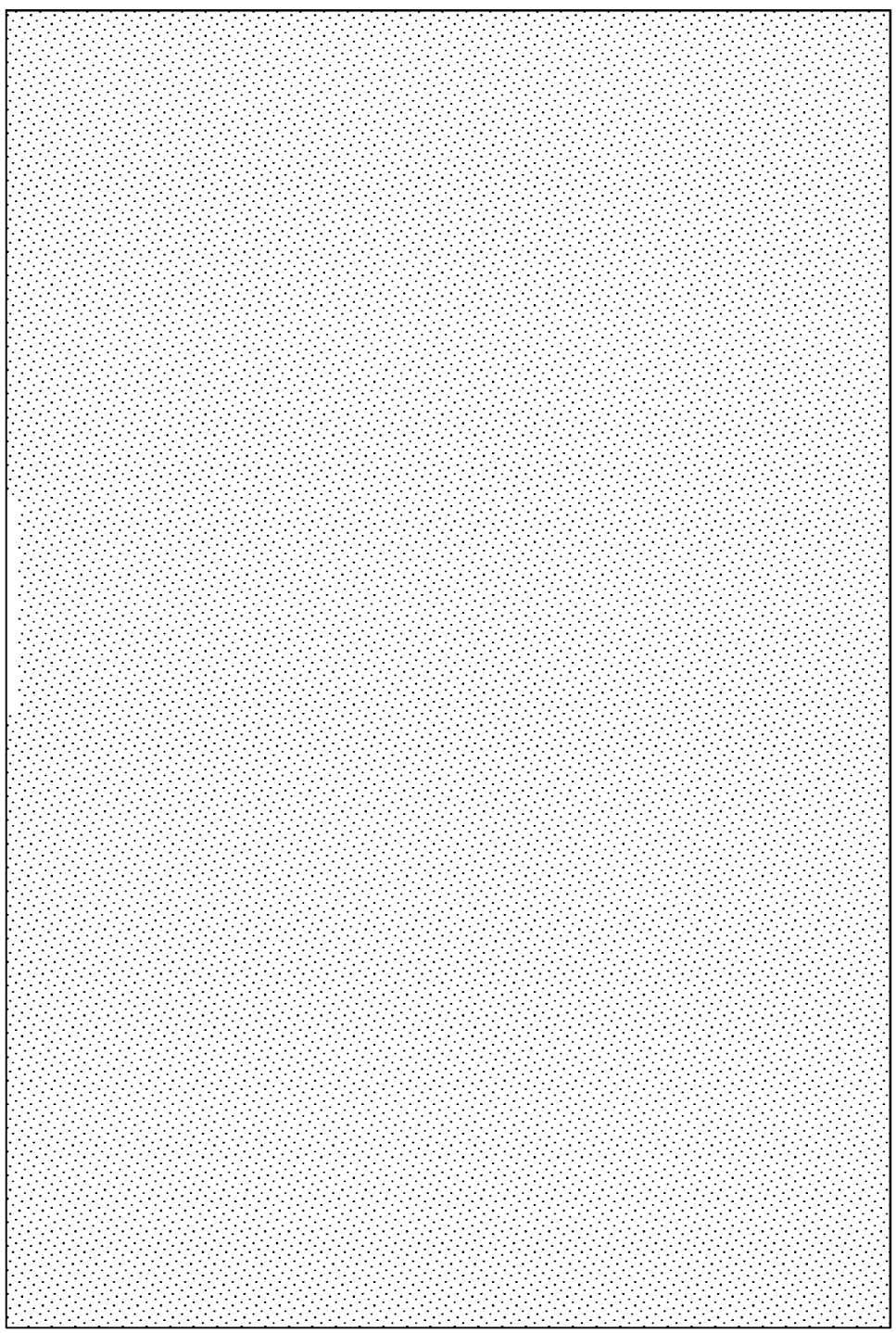
FIG. 5 illustrates in an image a laser illumination achieved using the embodiments.

FIG. 5 depicts in an illustration an example image 50 obtained by use of uniform illumination of an image sensor by a red laser pointer and incorporating a colloid diffuser of the embodiments. (Note that FIG. 5 is an illustration in black and white of a color image, black and white is used for purposes of this patent application.) As can be seen in FIG. 5, the image is free from any laser speckle effects. In sharp contrast to the image in FIG. 2 which was obtained using prior known diffuser with a similar laser source and without the use of the embodiments, the image of FIG. 5 illustrates the uniform illumination that is advantageously obtained by use of the embodiments.

In the system embodiments described above, a laser is used as the coherent light source. However other sources of coherent light such as incoherent sources that are directed through a pinhole or slit can be used to form additional embodiments. In alternative embodiments, various lasers can be used. Solid state lasers can be used. Semiconductor lasers can be used, such as for example those used in laser pointers and CD or DVD players. For example, p-i-n diodes can be used, edge emitting semiconductor diode lasers can be used, and double heterojunction diodes can be used. Additional embodiments are formed by the use of vertical cavity surface emitting lasers ("VCSELs") which feature a laser beam emitted perpendicular to a semiconductor wafer surface, in contrast to the edge emitter diodes. The embodiments and the appended claims are not limited to lasers, and other coherent light sources can be used to form additional alternative embodiments.

Advantages of the embodiments include that the construction is simple and inexpensive, that the novel diffuser can be added to existing laser illumination sources and systems easily, that the embodiments are completely passive and require no power, and that use of the embodiments does not introduce electrical or mechanical noise, while achieving results in uniform illumination that surprisingly exceed those obtained using prior known solutions.

Applications for the embodiments incorporating the diffuser including the colloid include any application where uniform illumination from a coherent light source is required. Examples include laser illumination, laser projectors, DLP projectors, TOF illumination sources, 3D imaging systems, machine vision systems, metering systems, autofocusing systems, optical measuring tapes and rulers, laser TV and video projectors, and other applications where coherent light illumination is used.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A diffuser for reducing laser speckle, comprising:
a colloid disposed in a container that is transparent to a selected light frequency and configured for placement in a light path of a coherent light source, wherein a thickness of the colloid in the diffuser is in a range of 1 nanometer to 5 microns.

2. The diffuser of claim 1, wherein the colloid exhibits Brownian motion.

3. The diffuser of claim 1, wherein the colloid further comprises a solid dispersed phase material disposed in a liquid dispersant.

4. The diffuser of claim 1, wherein the colloid further comprises a liquid dispersed phase material disposed in a liquid dispersant.

5. The diffuser of claim 1, wherein the colloid further comprises a solid dispersed phase material disposed in a gaseous dispersant.

6. The diffuser of claim 1, wherein the colloid further comprises a liquid dispersed phase material disposed in a gaseous dispersant.

7. The diffuser of claim 1, wherein the colloid further comprises one selected from the group consisting essentially of inks, sol paints, milks, emulsified paint, trans-Anethol/ethanol/water, fog, smoke, and combinations thereof.

8. The diffuser of claim 1, wherein the colloid in the diffuser is disposed between plates that are transparent and that further comprise one selected from the group consisting essentially of glass, Perspex, acrylic, polycarbonates, transparent ceramics and combinations thereof.

9. The diffuser of claim 8, wherein the plates that are transparent further comprise glass.

10. The diffuser of claim 1, wherein the colloid further comprises a solid dispersed phase material having a particle size between 1 nanometer and 1 micrometer.

11. A system for illumination, comprising:
a coherent source of light outputting a light beam along a light path; and
a diffuser for reducing laser speckle effects placed in the light path, the diffuser comprising a colloid disposed in the light path of the light beam output by the coherent source, wherein a thickness of the colloid in the diffuser is in a range of 1 nanometer to 5 microns.

12. The system of claim 11, wherein the diffuser further comprises:
the colloid comprising a solid dispersed phase material disposed in a liquid dispersant medium.

13. The system of claim 11, wherein the diffuser further comprises:
a liquid dispersed phase material disposed in a liquid dispersant medium.

14. The system of claim 11, wherein the coherent source further comprises a laser.

15. The system of claim 14, wherein the laser is one selected from the group consisting essentially of a semiconductor laser, a solid state laser, a p-i-n diode laser, an edge emitting laser diode, and a vertical cavity surface emitting laser.

16. The system of claim 11, wherein the diffuser further comprises the colloid disposed within a pair of transparent plates that are of a material that is one selected from the group consisting essentially of glass, acrylic, polycarbonate, Perspex ceramic glass, transparent ceramics and combinations thereof.

17. A method for illuminating a photosensitive sensor, comprising:
transmitting a coherent light from a light source through a diffuser comprising a colloid disposed in a container that is transparent to the coherent light and directing the light from the diffuser onto the photosensitive sensor, wherein a thickness of the colloid in the diffuser is in a range of 1 nanometer to 5 microns.

18. The method of claim 17, wherein the colloid exhibits Brownian motion.

19. The method of claim 17, wherein the colloid further comprises a material that is one selected from the group consisting essentially of a solid dispersed phase material disposed in a liquid dispersant, a liquid dispersed phase material disposed within a liquid dispersant, a solid dispersed phase material disposed in a gaseous dispersant, and a liquid dispersed phase material disposed within a gaseous dispersant.

* * * * *